US009027102B2

(12) United States Patent
Katzer et al.

(10) Patent No.: US 9,027,102 B2
(45) Date of Patent: May 5, 2015

(54) WEB SERVER BYPASS OF BACKEND PROCESS ON NEAR FIELD COMMUNICATIONS AND SECURE ELEMENT CHIPS

(75) Inventors: Robin Dale Katzer, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 73 days.

(21) Appl. No.: 13/470,203

(22) Filed: May 11, 2012

(65) Prior Publication Data

US 2013/0305333 A1    Nov. 14, 2013

(51) Int. Cl.
| G06F 15/16 | (2006.01) |
| G06F 7/04 | (2006.01) |
| H04L 29/06 | (2006.01) |
| G06F 21/62 | (2013.01) |
| G06Q 20/32 | (2012.01) |
| H04W 4/00 | (2009.01) |
| H04W 12/08 | (2009.01) |
| H04L 9/32 | (2006.01) |
| G06F 15/173 | (2006.01) |

(52) U.S. Cl.
CPC ........ *G06F 21/6245* (2013.01); *G06Q 20/3227* (2013.01); *G06Q 20/3278* (2013.01); *H04W 4/008* (2013.01); *H04W 12/08* (2013.01)

(58) Field of Classification Search
USPC .......... 726/2–8; 713/168–174, 182–186, 202; 709/225, 229
See application file for complete search history.

(56) References Cited

U.S. PATENT DOCUMENTS

| 5,303,378 | A | 4/1994 | Cohen |
| 5,796,952 | A | 8/1998 | Davis et al. |
| 6,131,024 | A | 10/2000 | Boltz |
| 6,219,712 | B1 | 4/2001 | Mann et al. |
| 6,477,180 | B1 | 11/2002 | Aggarwal et al. |
| 6,668,322 | B1 | 12/2003 | Wood et al. |
| 6,691,230 | B1 | 2/2004 | Bardon |
| 6,754,784 | B1 | 6/2004 | North et al. |
| 6,823,454 | B1 | 11/2004 | Hind et al. |
| 6,824,064 | B2 | 11/2004 | Guthery et al. |
| 6,895,234 | B1 | 5/2005 | Laursen et al. |
| 7,387,240 | B2 | 6/2008 | Ziegler |
| 7,552,467 | B2 | 6/2009 | Lindsay |

(Continued)

FOREIGN PATENT DOCUMENTS

| WO | WO2011025433 A1 | 3/2011 |
| WO | 2013170228 A2 | 11/2013 |

(Continued)

OTHER PUBLICATIONS

Notice of Allowance dated Nov. 29, 2013, U.S. Appl. No. 13/440,980, filed Apr. 5, 2012.

(Continued)

*Primary Examiner* — Evans Desrosiers

(57) ABSTRACT

A mobile access terminal providing access to data in a secure element of the mobile access terminal is provided. The mobile access terminal comprises the secure element; a web browser; a near field communications system; an over-the-air proxy; an application programming interface layer; and a web server residing on a secure storage area of the mobile access terminal, wherein the web browser is provided with exclusive access to the web server.

17 Claims, 6 Drawing Sheets

(56) References Cited

U.S. PATENT DOCUMENTS

| | | |
|---|---|---|
| 7,571,364 B2 | 8/2009 | Whetsel |
| 7,650,645 B1 | 1/2010 | Langendorf et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,954,588 B1 | 2/2015 | Bertz et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1* | 11/2004 | Melideo ............... 379/88.17 |
| 2004/0243810 A1 | 12/2004 | Rindborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1* | 1/2008 | Brown et al. ............... 726/5 |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0182634 A1 | 7/2009 | Park et al. |
| 2009/0193491 A1 | 7/2009 | Rao |
| 2009/0271321 A1 | 10/2009 | Stafford |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1* | 11/2010 | Deprun ............... 709/219 |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |

(56) References Cited

U.S. PATENT DOCUMENTS

| | | |
|---|---|---|
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Florek et al. |
| 2011/0113479 A1 | 5/2011 | Ganem |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | Voba et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1* | 10/2012 | Chen et al. ............ 455/411 |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1* | 10/2012 | Benaloh et al. ............ 726/9 |
| 2012/0284195 A1* | 11/2012 | McMillen et al. ......... 705/71 |
| 2012/0291095 A1 | 11/2012 | Narendra et al. |
| 2012/0295588 A1 | 11/2012 | Chen et al. |
| 2012/0297187 A1* | 11/2012 | Paya et al. ............ 713/156 |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1* | 5/2013 | Weinstein et al. ............ 705/67 |
| 2013/0136126 A1 | 5/2013 | Wang et al. |
| 2013/0138521 A1* | 5/2013 | Want et al. .......... 705/26.1 |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1* | 6/2013 | Mendel et al. .............. 726/4 |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0191632 A1 | 7/2013 | Spector et al. |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347103 A1 | 12/2013 | Veteikis et al. |
| 2014/0033316 A1 | 1/2014 | Paczkowski et al. |
| 2014/0047548 A1 | 2/2014 | Bye et al. |
| 2014/0074508 A1 | 3/2014 | Ying et al. |
| 2014/0155025 A1 | 6/2014 | Parker et al. |
| 2014/0188738 A1 | 7/2014 | Huxham |
| 2014/0245444 A1 | 8/2014 | Lutas et al. |
| 2014/0254381 A1 | 9/2014 | Racz et al. |
| 2014/0279558 A1 | 9/2014 | Kadi et al. |
| 2014/0281544 A1 | 9/2014 | Paczkowski et al. |

FOREIGN PATENT DOCUMENTS

| | | |
|---|---|---|
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Office Action dated Dec. 19, 2013, U.S. Appl. No. 13/557,213, filed Jul. 25, 2012.

FAIPP Pre-Interview Communication dated Nov. 27, 2013, U.S. Appl. No. 13/610,856, filed Sep. 11, 2012.

Notice of Allowance date Jan. 31, 2014, U.S. Appl. No. 13/610,856, filed Sep. 11, 2012.

Cope, Warren B., et al., "Extended Trusted Security Zone Radio Modem", filed Nov. 26, 2013, U.S. Appl. No. 14/090,667.

Paczkowski, Lyle W., et al., "Trusted Security Zone Containers for the Protection and Confidentiality of Trusted Service Manager Data", filed Feb. 16, 2014, PCT Application No. PCT/US14/16651.

Foreign Communication from a Related Counterpart—International Search Report and Written Opinion, dated Dec. 2, 2013, PCT/US13/40673, filed on May 10, 2013.

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 4, 2014, PCT/US13/47729, filed on Jun. 25, 2013.

Foreign Communication from a Related Counterpart—International Search Report and Written Opinion, dated Feb. 4, 2014, PCT/US13/51750, filed on Jul. 24, 2013.

(56) References Cited

OTHER PUBLICATIONS

FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal ", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., Bye, Stephen James, et al., "Delivering Digital Content to a Mobile Device via a Digital Rights Clearing House", filed Apr. 10, 2013, U.S. Appl. No. 13/860,338 .et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/40,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Notice of Allowance dated May 27, 2014, U.S. Appl. No. 13/482,731, filed May 29, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.

(56) References Cited

OTHER PUBLICATIONS

FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed Aug. 5, 2013.
FAIPP Pre-Interview Communication dated Mar. 20, 2014, U.S. Appl. No. 13/482,731, filed May 29, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
FAIPP Pre-Interview Communication dated Aug. 6, 2014, U.S. Appl. No. 13/831,486, filed Mar. 14, 2013.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed on Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed on Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138.
Office Action dated May 5, 2014, U.S. Appl. No. 13/786,450, filed Mar. 5, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp]sp2tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.
Notice of Allowance dated Feb. 5, 2015, U.S. Appl. No. 13/533,969, filed on Jun. 27, 2012.
Office Action dated Dec. 15, 2014, U.S. Appl. No. 13/571,348, filed on Aug. 10, 2012.
Restriction Requirement dated Jan. 2, 2015, U.S. Appl. No. 13/762,319, filed on Feb. 7, 2013.
Faipp Pre-Interview Communication dated Feb. 12, 2015, U.S. Appl. No. 14/066,661, filed on Oct. 29, 2013.
Notice of Allowance dated Dec. 3, 2014, U.S. Appl. No. 13/594,777, filed on Aug. 25, 2012.
First Action Interview Office Action dated Dec. 3, 2014, U.S. Appl. No. 13/594,779, filed on Aug. 25, 2012.
Notice of Allowance dated Feb. 26, 2015, U.S. Appl. No. 13/786,450, filed on Mar. 5, 2013.
FAIPP Pre-Interview Communication dated Dec. 16, 2014, U.S. Appl. No. 13/898,435, filed on May 20, 2013.
Notice of Allowance dated Feb. 20, 2015, U.S. Appl. No. 13/898,435, filed on May 20, 2013.
Notice of Allowance dated Dec. 19, 2014, U.S. Appl. No. 131844,325, filed on Mar. 15, 2013.
Notice of Allowance dated Jan. 2, 2015, U.S. Appl. No. 131831,463, filed on Mar. 14, 2013.
FAIPP Pre-Interview Communication dated Feb. 4, 2015, U.S. Appl. No. 14/075,663, filed on Nov. 8, 2013.
FAIPP Pre-Interview Communication dated Feb. 25, 2015, U.S. Appl. No. 14/163,047, filed on Jan. 24, 2014.
Restriction Requirement dated Jan. 5, 2015, U.S. Appl. No. 13/857,139, filed on Apr. 4, 2013.

(56) References Cited

OTHER PUBLICATIONS

Foreign Communication from a Related Counterpart—International Preliminary Report on Patentability, dated Jan. 8, 2015, PCT/US13/47729, filed on Jun. 25, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Preliminary Report on Patentability, dated Feb. 5, 2015, PCT/US13/51750, filed on Jul. 24, 2013.

Katzer, Robin D., et al., "Web Server Bypass of Backend Process on Near Field Communications and Secure Elements Chips", filed Feb. 26, 2015, U.S. Appl. No. 14/632,850.

Neson, Tracy L., et al., "Mated Universal Serial Bus (USB) Wireless Dongles Configured with Destination Addresses", filed Jan. 26, 2015, U.S. Appl. No. 14/606,011.

Paczkowski, Lyle W., et al., "Trusted Code Generation and Verification to Prevent Fraud from Maleficent External Devices that Capture Data", filed Jan. 14, 2015, U.S. Appl. No. 14/592,218.

* cited by examiner

WEB SERVER BYPASS OF BACKEND PROCESS ON NEAR FIELD COMMUNICATIONS AND SECURE ELEMENT CHIPS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices may access resources such as the Internet to perform a variety of transactions that may include online purchases of goods and/or services. In the course of paying for such goods and/or services, the mobile device user may provide payment information such as credit card account information. This information may be of a private nature that calls for security measures to avoid theft or fraud.

SUMMARY

In an embodiment, a mobile access terminal providing access to data in a secure element of the mobile access terminal is disclosed. The mobile access terminal comprises the secure element; a web browser; a near field communications system; an over-the-air proxy; an application programming interface layer; and a web server residing on a secure storage area of the mobile access terminal, wherein the web browser is provided with exclusive access to the web server.

In an embodiment, a method for securing user data on a mobile access terminal is disclosed. The method comprises providing, by a mobile access terminal, a secure element, a web browser, a near field communication system, an over-the-air proxy, a trusted security zone, an application programming interface layer, and a web server, wherein the web server is located in a secure storage area of the mobile access terminal; securely storing, by the mobile access terminal, secure user data of the user of the mobile access terminal; initiating, by the mobile access terminal, a transaction with another system; accessing exclusively, by the web browser of the mobile access terminal, the secure data from the web server on the core of the mobile access terminal; executing a secure transaction, by the mobile access terminal, with another system.

In an embodiment, a mobile access terminal providing access to data in a secure element of the mobile access terminal is disclosed. The mobile access terminal comprises the secure element; a web browser; a near field communications system; an over-the-air proxy; a trusted security zone; an application programming interface layer; and a web server residing on a secure storage area of the mobile access terminal, wherein the web browser is provided with exclusive access to the web server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
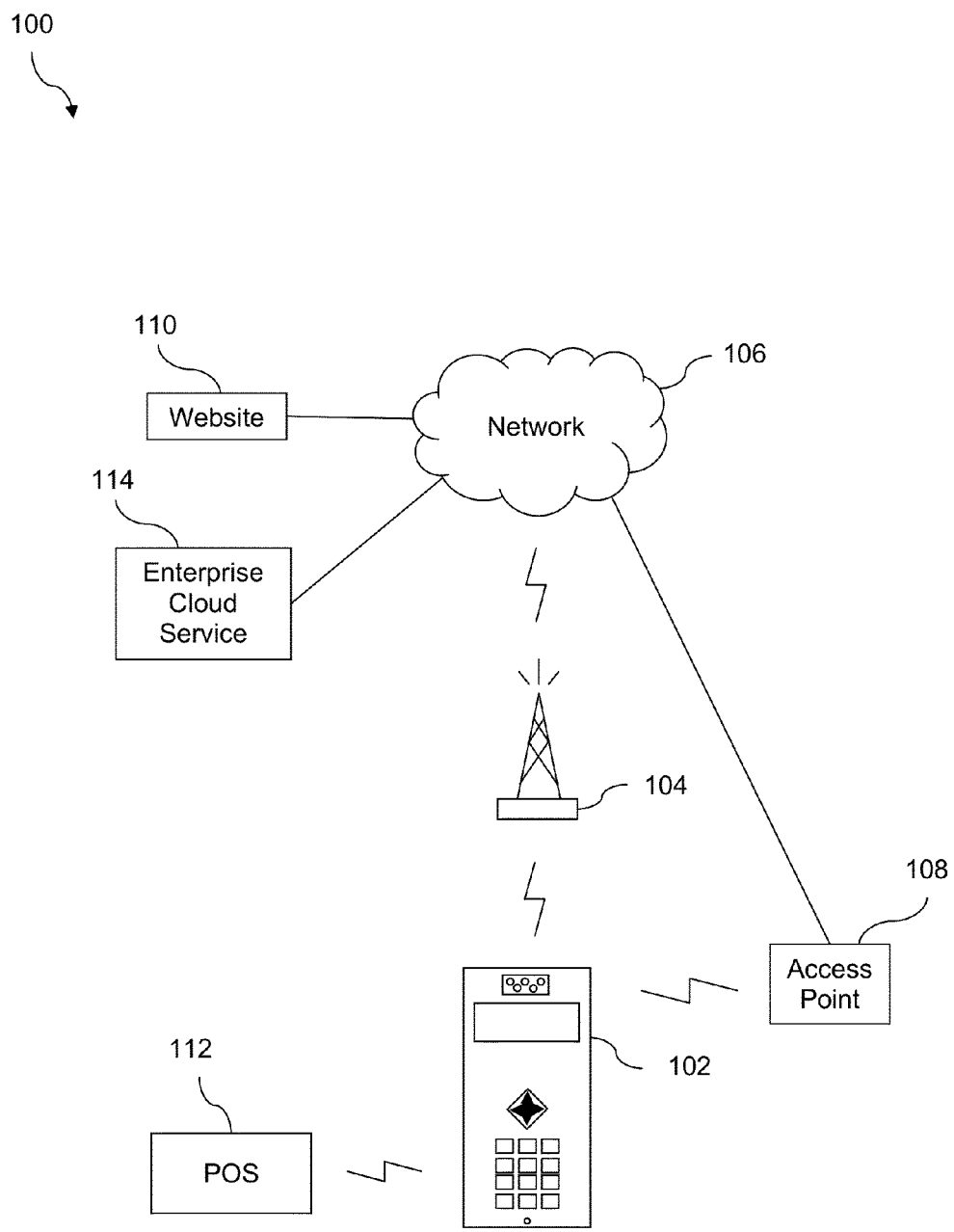
FIG. 1 illustrates a mobile communication system, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and method are disclosed. The system and method provide a mobile access terminal (e.g. a mobile phone) with the ability to conduct transactions via a secure element and/or a trusted security zone located on the core of the mobile access terminal. For example, a mobile phone user may wish to connect to the Internet, via a browser on the mobile phone, in order to visit a merchant website to purchase merchandise. The user may select merchandise from the website and may make a purchase with, for example, a credit card or debit card. For convenience, the mobile phone user may store their credit card information on their mobile phone. For security reasons, the mobile phone user may prefer that the information pertaining to their credit cards (e.g. card number, security code information, expiration date, and so on) be stored in a manner that reduces the chances that this information will fall into the hands of those that might use it for nefarious reasons such as identity theft. The mobile phone user may therefore store their credit card information in a secure location within their mobile phone, such as in a secure element. A secure element may be a portion of the hardware of a mobile phone such as a computer chip (e.g. a core) of the mobile phone. The secure element may, in essence, act as a separate entity within the core of the mobile phone, and may be arranged and configured to store private information in a way that enhances the security of said information.

In an embodiment, a mobile phone may be provided with a web server executing within a secure element of the mobile phone. The web server may be provided as a physical embodiment, a software embodiment, or any combination thereof, and may be associated with a near field communication unit or the secure element of the mobile phone. Executing within the secure element of the mobile phone allows the web server direct access to the data stored on the secure element while keeping the data secure from outside access. This arrangement may give the mobile phone the ability to store secure information (e.g. credit card information) within the mobile phone and to then provide the secure information to the web browser of the mobile phone. The web browser of the mobile phone may then pass the secure information along to a website so that the user of the mobile phone may make a purchase from the website, using their stored credit card information, in a way that both simplifies their transaction and concurrently protects the security of their sensitive information. This scenario may be facilitated by configuring the mobile phone so that access to the web server is provided to the onboard web browser. Access to the onboard web server by any other entity is inhibited. The web server may be configured to only allow access to the onboard web browser, blocking access attempts from other internet protocol (IP) addresses. Since the web server resides on the secure element, the configuration data for the web server also reside on the secure element, maintaining the security of the configuration data. Restricting access to the web server to other entities prevents outside access to the data on the secure element and preserves the integrity of the secure element data. This may promote the security of the user's sensitive information, yet may also promote easy access by the mobile phone user. Secure information may be stored within a secure element and/or a trusted security zone of the mobile phone, in order to restrict access to the secure information such as credit card information, electronic tickets or personal medical information.

As used herein, the term "secure element" may be used to describe, for example, a tamper proof chip capable of accepting embedded applications or applets with an appropriate level of security. In near-field communication (NFC) architecture, the secure element may embed contactless and/or may be connected to the near-field communication chip in a way that permits it to act as a contactless front end. The secure element may be implemented via various form factors, including directly embedded in a mobile phone or a chip or chipset thereof.

In an embodiment, a trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming mainstream features in mobile device chipsets. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete Trusted Execution Environment (TEE) may be implemented through the use of the trusted security zone hardware and software architecture. The Trusted Execution Environment is an execution environment that is parallel to the execution environment of the main mobile device operating system. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as sensors, medical devices, point-of-sale terminals, industrial automation, handheld terminals, automotive, etc.

The trusted security zone may be implemented by partitioning all of the hardware and software resources of the mobile device into two partitions: a secure partition and a normal partition. In some contexts, the secure partition may be referred to as a secure world or a secure execution world and the normal partition may be referred to as a non-secure world or a non-secure execution world. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution environment, the main mobile operating system in the normal partition is suspended, and applications in the normal partition are prevented from accessing the secure peripherals and data. This prevents corrupted applications or malware applications from breaking the trust of the device.

The trusted security zone may be implemented by partitioning the hardware and software resources to exist in a secure subsystem which is not accessible to components outside the secure subsystem. The trusted security zone is built into the processor architecture through hardware logic present in the trusted security zone which enables a perimeter boundary between the secure partition and the normal partition. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications may run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors may context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor. The trusted security zone runs a separate operating system that is not accessible to the mobile device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is illustrated. In an embodiment, system 100 comprises a mobile handheld device 102, a base transceiver station (BTS) 104, a network 106 such as the Internet, an access point 108, a website 110, a point-of-sale device 112, and an enterprise cloud service 114. While illustrated as a mobile phone 102, mobile device 102 may also be a wireless handset, a pager, a personal digital assistant (PDA), a gaming device, or a media player. For the sake of discussion, mobile handheld device 102 will hereinafter be referred to as mobile phone 102, with the understanding that it may embody any form of device suitable for the purposes described in the present disclosure.

BTS 104 may provide for transmitting and receiving radio signals via equipment such as antennas, transceivers, and/or equipment for encrypting and/or decrypting communications between entities and/or locations. BTS 104 may have several transceivers which allow it to serve multiple frequencies and different sectors of a communications cell. BTS 104 is generally controlled by a base station control function, which is implemented as a discrete unit or incorporated into a transceiver. The functions of BTS 104 may vary, depending on the cellular technology used and the cellular telephone provider, but the function of receiving/retransmitting signals as in mobile phone 102 calls and/or messages, is generally the same across various forms of BTS 104. BTS 104 and similar systems are generally equipped with radios that are able to modulate frequencies for Code Division Multiple Access (CDMA) communication signals, Global System for Mobile communication signals such as GSM, GSM 2G+, GSMK, 8-PSK, Worldwide Interoperability for Microwave Access (WiMAX), or Long Term Evolution (LTE) communication signals, as appropriate for a given network. Mobile phone 102 may be configured to connect wirelessly to a network such as network 106 via, for example, BTS 104 or any combination of BTS's, as might be appropriate in a given circumstance. Mobile phone 102 may thereby be availed of access to network 106 and also to a website such as website 110, a cloud service such as enterprise cloud service 114, and/or an access point such as access point 108, each of which may be communicatively coupled to network 106 in any suitable manner.

System 100 further comprises a point-of-sale terminal 112 (POS). The point-of-sale terminal 112 may be a wireless terminal for conducting contactless transactions such as merchandise purchases or the like. In an embodiment, the mobile phone 102 may be configured to transact a payment at the point-of-sale terminal 112 at a convenience store. A user of mobile phone 102 may enter a convenience store, select an item, and purchase the item by scanning the item at the point-of-sale terminal 112 and then securely transmitting payment information such as credit card information from mobile phone 102 to the point-of-sale terminal 112. This secure transmission may take place with the aid of secure hardware, firmware, and/or software of the mobile phone 102, as will be discussed in further detail, below. In this manner, the mobile phone 102 user may complete the entire transaction without the assistance of an agent of the convenience store. Alternatively, an agent of the convenience store may scan the item or otherwise assist in the purchase of the item, as may be appropriate for a given situation.

In an embodiment, a web server resides within the secure element of the mobile access terminal, and the web server comprises software and/or hardware. The secure element offers security based on hardware and/or software architecture. Placing the web server inside the secure element and configuring the web server to respond to specific components and requests protects the web server and the information it accesses from being compromised.

In an embodiment, the web server is operable to interact with the web browser to share data from the secure element. The web server is configured to accept requests from the web browser and respond to the requests with data stored in the secure element. For example, the web server may respond to requests from the web browser by sending credentials from the secure element to the website 110 to complete a purchase or transaction. This provides a mechanism for utilizing the mobile phone 102 to facilitate purchases over the Internet with the same security and using the same financial data as is used for transactions utilizing near field communications with a point-of-sale device 112.

In an embodiment, a call session control function (CSCF) resides on the core of the secure element. The call session control function is a central component to signaling and control within the IP Multimedia Subsystem (IMS) network. The IP Multimedia Subsystem is a framework for delivering Internet services over mobile networks to aid the access of multimedia and voice applications from the mobile phone 102. Providing the call session control function on the core of the secure element may allow the mobile phone 102 to securely support accessing multimedia applications without the need to access the mobile network.

In an embodiment, the secure element comprises dedicated, embedded hardware in the mobile access terminal. The secure element may reside on a specialized embedded hardware semiconductor chip that is designed to thwart attempts to reverse engineer the secure element or to physically slice and examine the secure element under a microscope. The secure element is a combination of hardware, firmware, and/or software that enables secure storage and usage of credentials and data for electronic payments, authentication and other services. This secure storage is kept private from components outside of the secure element to provide enhanced security to data kept in the private space.

In an embodiment, the secure element further comprises a kernel of an operating system. The kernel is the main component of the operating system, managing the communication between hardware and software components of the computer. Implementing an operating system and kernel on the secure element may isolate the data on the secure element and enhance the security by further restricting access to the hardware and data from other components of the mobile phone 102.

Figure 2:
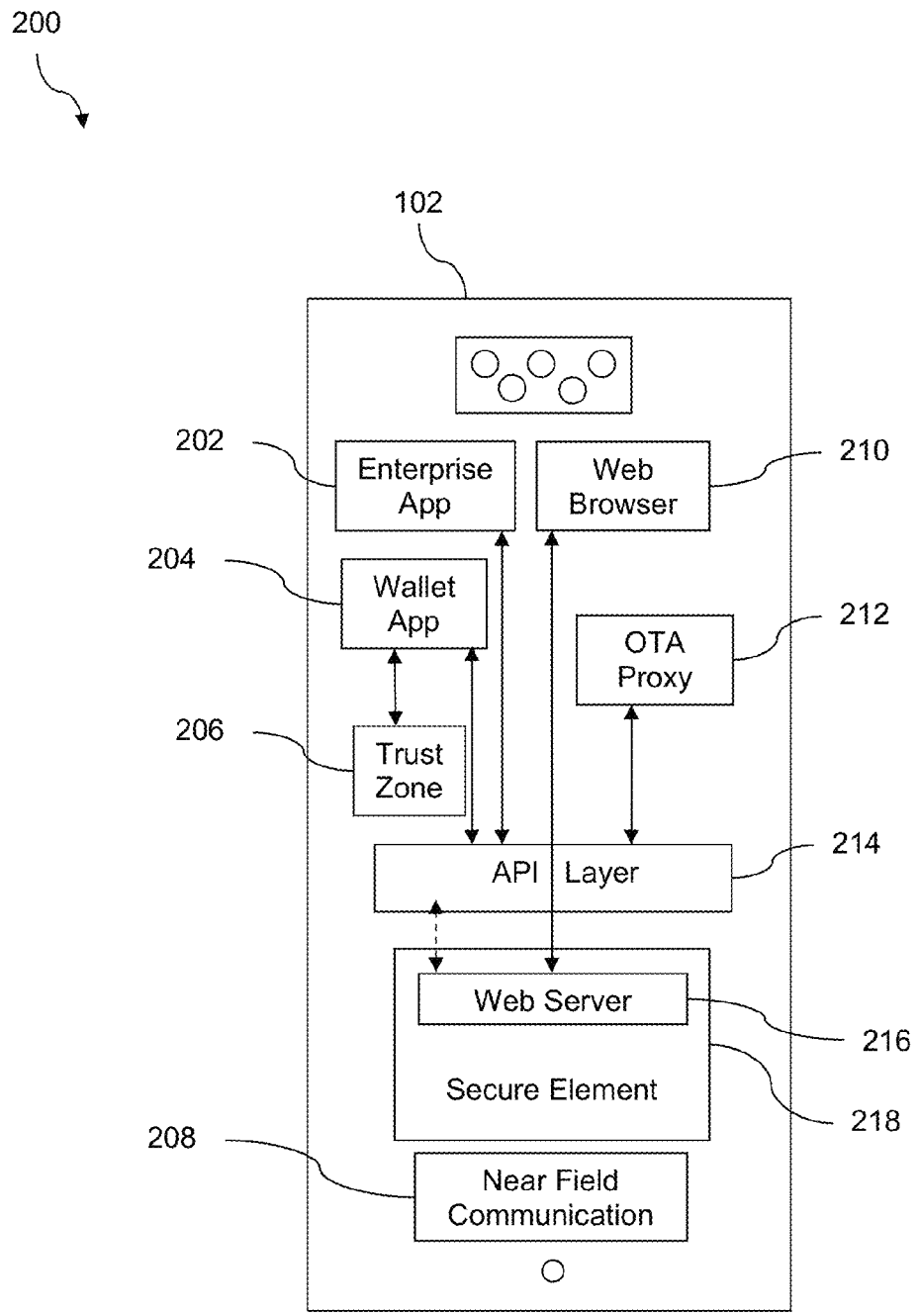
FIG. 2 illustrates a handheld mobile device, according to an embodiment of the disclosure.

Turning now to FIG. 2, further details of the mobile phone 102 are described. In an embodiment, the mobile phone 102 comprises an enterprise application 202, a wallet application 204, a trusted security zone 206, a near field communication unit 208, a web browser 210, an over-the-air (OTA) proxy 212, an application programming layer 214, a web server 216, a secure element 218. The wallet application 204 may be a mobile payment system that allows a user to store credit card information, loyalty card information, and gift card information, and such for conducting payment transactions via the mobile phone 102, as discussed above with reference to a point-of-sale purchase. The enterprise application 202 may interface with the enterprise cloud service 114 to retrieve and store secure data. The wallet application 204 may assist in making secure payments by operating the mobile phone 102 in such a way that payment information (e.g. credit card information) is communicated to a terminal such as the point-of-sale terminal 112 or a website such as the website 110. In addition or alternatively, the near field communication unit 208 may likewise be involved in the process of securely transmitting information involved in transactions with third party entities or such.

In an embodiment, a trusted service manager, wishing to initialize the secure element 218, may send a short message to the mobile phone 102 to set up the secure element 218. The message is passed to the OTA proxy 212, the OTA proxy 212 authenticates itself and sends a master key to the trusted services manager. The trusted services manager changes the key in the secure element 218. At this point, the secure element 218 is then configured for use.

In an embodiment, a user of mobile phone 102 may employ web browser 210 to navigate to a vendor website such as, for example, Amazon.com. The user may identify a book or other item that they would like to purchase and may add the item to an online shopping cart. When the user has finished selecting items they wish to purchase, they may complete the purchase by conducting an electronic transaction via the website 110 (e.g. "checking out"). For example, the user may navigate to a location on the website 110 where they may view the items in their online shopping cart, add shipping information, determine shipping rates, and the like. The user may then complete the transaction by providing payment in the form of credit or debit card information, which may be transmitted electronically by the mobile phone 102.

In an embodiment, mobile phone 102 may securely store the user's credit card information in, for example, the secure element 218 and/or the trusted security zone 206. When prompted, the Amazon.com website may request that the web browser 210 provide payment information details (e.g. credit card number, credit card holder's name as it appears on the credit card, credit card expiration date, billing address, and so on). The web browser 210 may, in turn, request the user's credit card information from the web server 216. When the web server 216 receives the request from the web browser 210, the web server 216 may recognize the web browser 210 and may provide the requested information to the web browser 210.

In an embodiment, if a request for secure information is received by the web server 216 from any source other than from the web browser 210 (the "onboard" web browser that resides within the mobile phone 102), the request may be denied by the web server 216. In this manner, by only sharing sensitive information with the web browser 210, the security of the sensitive information may be preserved and protected from accidental or malicious sharing of said information. This scenario may facilitate transactions via a mobile device such as the mobile phone 102 in such a manner that it simplifies conducting secure transactions with the mobile phone 102 and concurrently minimizes the concern that sensitive information may be compromised.

In an embodiment, the transaction described above may be conducted between the web browser 210 and the web server 216, or may alternatively include any or all of the trusted security zone 206 and the wallet app 204. For example, the secure information described above may be stored permanently or temporarily in the trusted security zone 206, the wallet app 204, the web server 216, the secure element 218, or a combination of any of these portions of the mobile phone 102. In addition or alternatively, portions of the secure information may be parceled out to more than one of the trusted security zone 206, the wallet app 204, and/or the web server 216, and may then be recombined when the information is requested by, for example, a vendor website that is attempting to complete a transaction with the user of the mobile phone 102. By storing credit card information in one or more of these secure locations, the credit card information may be kept safe, yet may be made available for conducting such transactions.

In an embodiment, the web server 216 resides within one or more of the secure element 218 and the trusted security zone 206 of the mobile access terminal, and the web server 216 comprises one or more of software and hardware. The trusted security zone 206 and the secure element 218 offer security based on hardware and software architecture. Placing the web server 216 inside these secure areas and configuring the web server 216 to respond to specific components and requests protects the web server and the information it accesses from being compromised.

In an embodiment, the web server 216 is operable to interact with the web browser 210 to share data from one or more of the secure element 218 and the trusted security zone 206. The web server 216 is configured to accept requests from the web browser 210 and respond to the requests with data stored in the trusted security zone 206, the secure element 218, or both depending on the location and secure data access granted to the web server 216. In an embodiment, the communication between the secure element 218 and the components 202, 204, 212, 210 may pass through the application programming layer 214.

In an embodiment, the web server 216 resides within the trusted security zone 206 of the mobile phone 102 and the web server 216 enables communication using the Hypertext Transfer Protocol Secure (HTTPS) protocol. Hypertext Transfer Protocol Secure is a combination of Hypertext Transfer Protocol with Secure Sockets Layer (SSL)/Transport Layer Security (TSL) providing encrypted and secure communication with the web server 216. Implementing Hypertext Transfer Protocol Secure allows encryption of the data being accessed by the web server 216 providing greater security when the data leaves the trusted security zone 206 and passed to the web browser 210.

In an embodiment, the mobile phone 102 further comprises an enterprise application 202 communicating with an enterprise cloud service 114, where the enterprise application 202 accesses the web server 216 to retrieve a certificate and a secret key stored in the trusted security zone and where the certificate and secret key are used to confirm the identity of the mobile access terminal to the enterprise cloud service 114.

A certificate is an electronic document which uses a digital signature to bind a security key with an identity. A secret key is a private security key that is used to generate the certificate and to decrypt the information sent by the enterprise application 202 to the enterprise cloud service 114. The use of the certificate and the secret key ensures the identity of the mobile phone 102 and allows the enterprise cloud service 114 to securely receive and respond to requests from the enterprise application 202.

Figure 3:
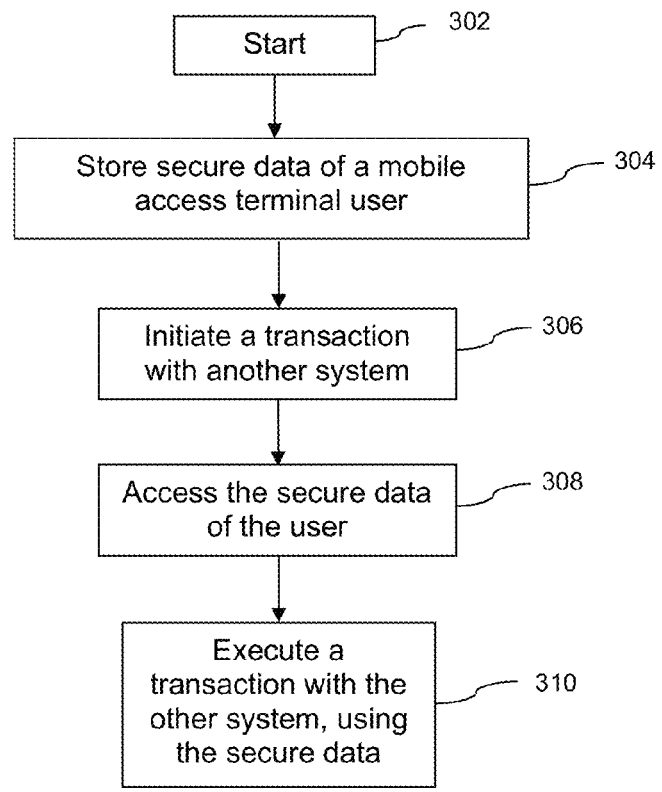
FIG. 3 illustrates a method, according to an embodiment of the disclosure.

Turning now to FIG. 3, a method 300 is illustrated. At step 302, method 300 begins (e.g. starts). At step 304, secure (e.g. sensitive) information may be stored within one or more location in mobile phone 102. As described in greater detail above, sensitive information such as credit/debit card information may be securely stored in any one or more of the wallet app 204, the trusted security zone 206, the web server 216, and/or the secure element 218. In an embodiment, sensitive information may be accessed by the web server 216, which may then share the sensitive information with the web browser 210, when appropriate. This internal trust relationship among portions of the mobile phone 102 may facilitate secure maintenance and transmittal of the user of the mobile phone 102 in a way that allows for simplified use of the sensitive information, while maintaining the security thereof.

At step 306, the user of mobile phone 102 may initiate a transaction with another system. For example, a user may navigate to a website of a vendor in order to procure goods or services therefrom. The user may choose the particular goods or services they want by, for example, selecting an item from an assortment of items on a web page. Once they have selected the item or items they want, they may select an option to check out. At step 308, the web browser 210 may notify the web server 216 that information of the user's credit card is to be shared with the vendor's website. The web server 216 may have stored the required information in the mobile phone 102 from any one or more of the wallet app 204, the trusted security zone 206, and/or the secure element 218. At step 310, when in the checkout phase of the transaction, the user may be requested to input payment information such as credit card information, in order to complete the transaction. When prompted, the user may direct mobile phone 102 to send the user's secure information to the website. By doing this, the user may be spared the steps of finding their credit card and filling in the credit card account number, expiration date, name as it appears on the card, card security value (CSV) number, and any other such information useful to successfully complete the payment phase of the transaction.

In an embodiment, the web server 216 resides within one or more of a secure element 218 of the mobile phone 102 and a trusted security zone 206 of the mobile phone 102. The secure element 218 of the mobile phone 102 may be an embedded chip built into the hardware architecture of the mobile phone 102. The trusted security zone 206 may be tightly integrated with the processor in a system wide approach to security. The trusted security zone 206 and the secure element 218 offer security based on hardware and software architecture. Placing the web server 216 inside these secure areas and configuring the web server 216 to respond to specific components and requests protects the web server 216 and the information it accesses from being compromised.

In an embodiment, the web server 216 is operable to interface with the web browser 210 to share data from one or more of the secure element 218 and the trusted security zone 206. The web server 216 is configured to accept requests from the web browser 210 and respond to the requests with data stored in the trusted security zone 206, the secure element 218, or both depending on the location and secure data access granted to the web server 216. For example, the user may have credit card information stored in the trusted security zone 206 and/or the secure element 218. When the user wants to execute a purchase from a web site, the web browser 210 sends a request to the web server 216 to retrieve the credit card information from the trusted security zone 206 or the secure element 218 and send it to the web site to complete the transaction.

In an embodiment, the method 300 further comprises a call session control function residing on the core of the secure element. The call session control function is a central component to signaling and control within the IP Multimedia Subsystem (IMS) network. The IP Multimedia Subsystem is a framework for delivering Internet services over mobile networks to aid the access of multimedia and voice applications from the mobile phone 102. Providing the call session control function on the core of the secure element may allow the mobile phone 102 to securely support accessing multimedia applications without the need to access the mobile network.

In an embodiment, the trusted security zone 206 is built into the mobile phone 102 processor architecture. The trusted security zone 206 is implemented at least in part by partitioning the hardware and software resources of the mobile access terminal. The trusted security zone 206 is built into the processor architecture through hardware logic present in the trusted security zone 206 which enables a perimeter boundary between a secure partition and a normal partition. This secure partition contains the trusted security zone 206 and is kept private from components outside of the trusted security zone 206 to provide enhanced security to data kept in the secure partition.

In an embodiment, the secure user data is stored in the trusted security zone 206 of the mobile phone 102 and the stored secure user data comprises a certificate and a secret key for use by an enterprise application 202 on the mobile phone 102 to verify the identity of the device to an enterprise cloud service 114. The use of the certificate and the secret key ensures the identity of the mobile phone 102 and allows the enterprise cloud service 114 to securely receive and respond to requests from the enterprise application 202.

In an embodiment, the enterprise application 202 accesses the web server 216 using the Hypertext Transfer Protocol Secure (HTTPS) protocol to create a secure tunnel to retrieve the certificate and a secret key. Implementing the Hypertext Transfer Protocol Secure protocol ensures the data is transferred through an encrypted channel when the enterprise application 202 retrieves the certificate and the secret key to interface with the enterprise cloud service 114.

Figure 4:
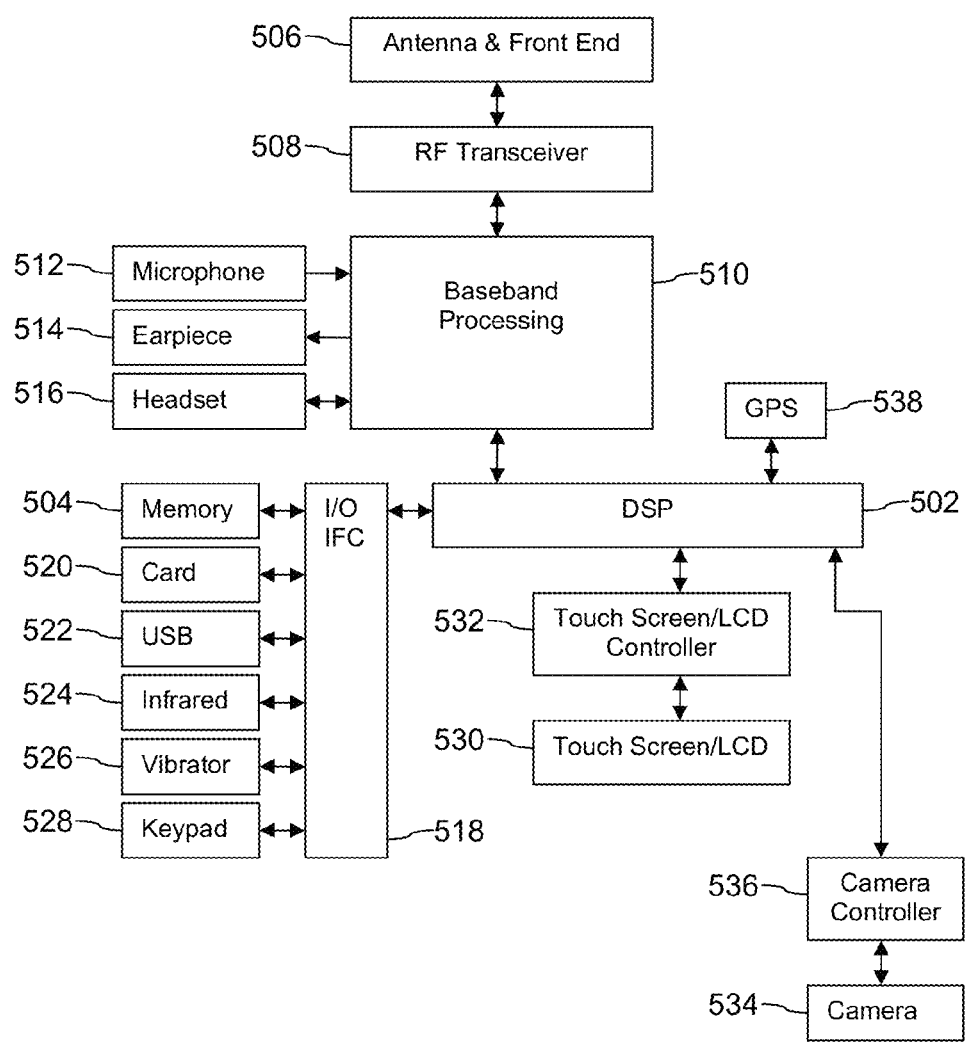
FIG. 4 illustrates a block diagram of a handheld mobile device, according to an embodiment of the disclosure.

FIG. 4 shows a block diagram of mobile device 102. While a variety of known components of handsets are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 102 may include another kind of display that does not provide a touch sensitive screen. In an embodiment, the DSP 502 may communicate directly with the memory 504 without passing through the input/output interface 518. Additionally, in an embodiment, the mobile device 102 may comprise other peripheral devices that provide other functionality.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth® interface or an IEEE 802.11 compliant wireless interface may enable the mobile device 102 to communicate wirelessly with other nearby handsets and/or wireless base stations.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 102 to determine its position.

Figure 5A:
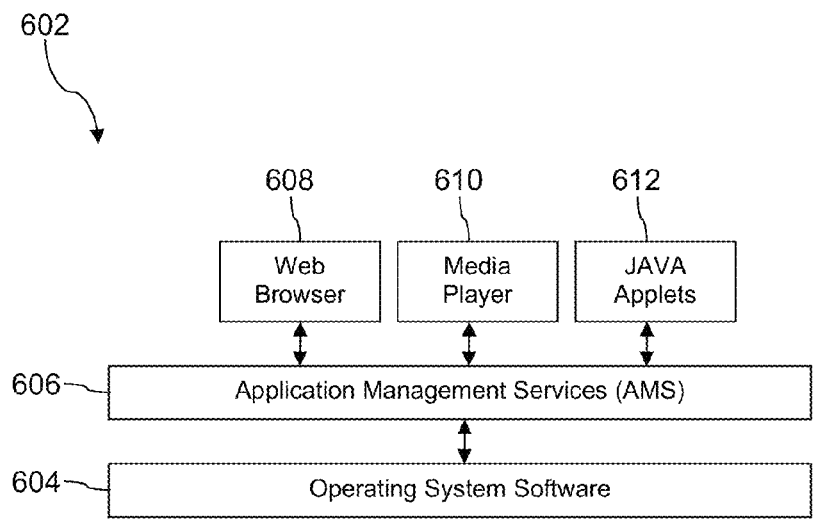
FIGS. 5a and 5b illustrate block diagrams of software environments, according to embodiments of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 102. Also shown in FIG. 5A are a web browser application 608, a media player application 610, and JAVA applets 612. The web browser application 608 may be executed by the mobile device 102 to browse content and/or the Internet, for example when the mobile device 102 is coupled to a network via a wireless link. The web browser application 608 may permit a user to enter information into forms and select links to retrieve and view web pages. The media player application 610 may be executed by the mobile device 102 to play audio or audiovisual media. The JAVA applets 612 may be executed by the mobile device 102 to provide a variety of functionality including games, utilities, and other functionality.

Figure 5B:
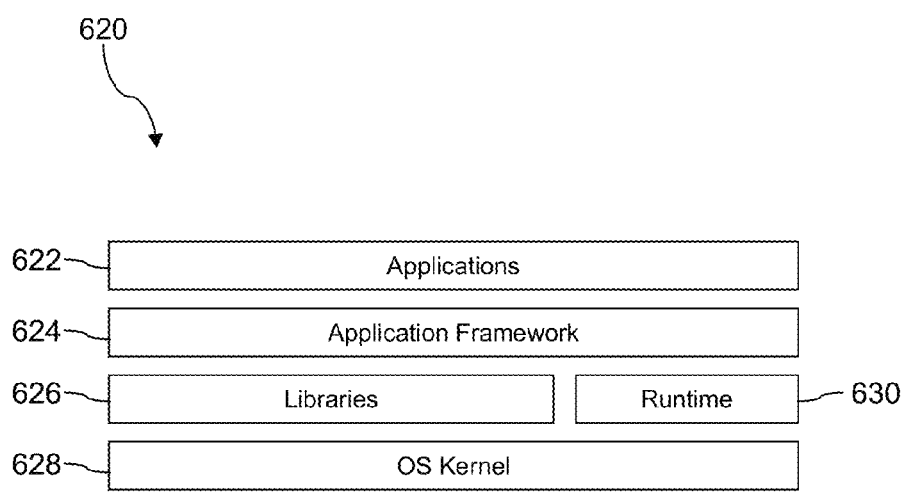

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
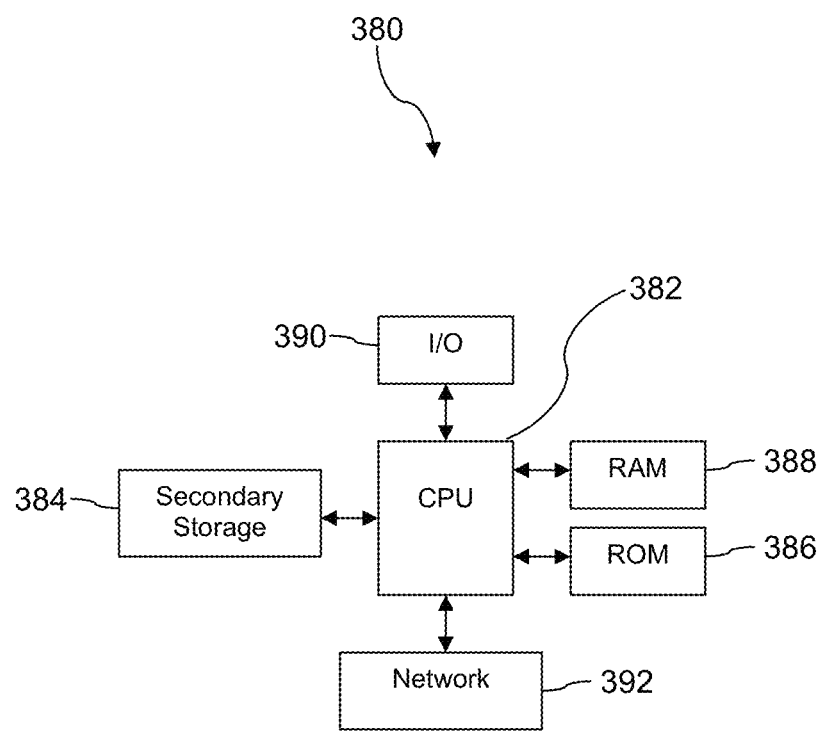
FIG. 6 illustrates a computer system suitable for implementing several embodiments of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile access terminal providing access to secure information in a secure element of the mobile access terminal comprising:
   the secure element storing the secure information;
   a web browser configured to transmit a secure information request to a server and transmit the secure information to a vendor;
   a trusted security zone, wherein the trusted security zone provides at least one chipset with a hardware root of trust, a secure execution environment for applications, and secure access to peripherals, wherein the trusted security zone stores a certificate and a secret key for use by an enterprise application on the mobile access terminal to verify the identity of the mobile access terminal to an enterprise cloud service, and wherein the enterprise application accesses the server to create a secure tunnel to retrieve the certificate and secret key; and
   the server residing and executing within at least one of the secure element or the trusted security zone of the mobile access terminal, wherein the server is configured to provide access to the secure information stored in the secure element exclusively to the web browser in response to receiving the secure information request from the web browser, and wherein the server is configured to block access to the secure information stored in the secure element when receiving secure information requests from entities other than the web browser.

2. The system of claim 1, wherein the server comprises one or more of software and hardware.

3. The system of claim 1, wherein the server is operable to interact with the web browser to share data from the secure element.

4. The system of claim 1, wherein a call session control function resides on the core of the secure element.

5. The system of claim 1, wherein the secure element comprises dedicated, embedded hardware in the mobile access terminal.

6. The system of claim 1, wherein the secure element further comprises a kernel of an operating system.

7. The system of claim 1, wherein the server is secure and is protected from being compromised.

8. A method for securing user data on a mobile access terminal comprising:
   providing, by a mobile access terminal, a secure element, a web browser, a trusted security zone, and a server, wherein the server executes from and is located in at least one of the secure element or the trusted security zone, and wherein the trusted security zone provides at least one chipset with a hardware root of trust, a secure execution environment for applications, and secure access to peripherals;
   securely storing, by the mobile access terminal, secure user data of the user of the mobile access terminal in a secure storage area, wherein the secure user data comprises a certificate and a secret key stored in the trusted security zone of the mobile access terminal for use by an enterprise application on the mobile access terminal to verify the identity of the mobile access terminal to an enterprise cloud service, and wherein the enterprise application accesses the server to create a secure tunnel to retrieve the certificate and secret key;
   initiating, by the mobile access terminal, a transaction with another system;
   transmitting a secure user data request from the web browser to the server in response to initiating the transaction with the other system;
   accessing, by the web browser, the secure user data from the secure storage area via the server in response to the server receiving the secure user data request from the web browser, wherein the server is configured to provide access to the secure user data stored in the secure storage area exclusively to the web browser in response to receiving the secure user data request from the web browser, and wherein the server is configured to block access to the secure user data stored in the secure storage area when receiving secure user data requests from entities other than the web browser; and
   executing a secure transaction, by the mobile access terminal, with the other system.

9. The method of claim 8, wherein the server is operable to interface with the web browser to share data from one or more of the secure element and the trusted security zone.

10. The method of claim 8, further comprising a call session control function residing on the core of the secure element.

11. The method of claim 8, wherein the trusted security zone is built into the mobile access terminal processor architecture.

12. The method of claim 8, wherein the enterprise application accesses the server using a Hypertext Transfer Protocol Secure (HTTPS) protocol to create the secure tunnel to retrieve the certificate and secret key.

13. The method of claim 8, wherein the secure storage area comprises at least one of the secure element or the trusted security zone.

14. A mobile access terminal providing access to secure information in the mobile access terminal, the mobile access terminal comprising:
   a secure element;
   a web browser configured to transmit a secure information request to a server and transmit the secure information to a vendor;
   a trusted security zone, wherein the trusted security zone provides at least one chipset with a hardware root of trust, a secure execution environment for applications, and secure access to peripherals, and wherein the trusted security zone and the secure element are located in a core of the mobile access terminal;
   the server residing and executing within at least one of the secure element or the trusted security zone, wherein the server is configured to provide access to the secure information stored in the secure element or the trusted security zone exclusively to the web browser in response to receiving the secure information request from the web browser, and wherein the server is configured to block access to the secure information stored in the secure element or the trusted security zone when receiving secure information requests from entities other than the web browser; and an enterprise application communicating with an enterprise cloud service, wherein the enterprise application accesses the server to create a secure tunnel to retrieve a certificate and a secret key stored in the trusted security zone, and wherein the certificate and the secret key are used to confirm the identity of the mobile access terminal to the enterprise cloud service.

15. The system of claim 14, wherein the server comprises one or more of software and hardware.

16. The system of claim 14, wherein the server is operable to interact with the web browser to share data from one or more of the secure element and the trusted security zone.

17. The system of claim 14, wherein the server resides within the trusted security zone of the mobile access terminal, and wherein the server enables communication using a Hypertext Transfer Protocol Secure (HTTPS) protocol.

* * * * *